(12) United States Patent
Schroeder

(10) Patent No.: US 7,503,576 B1
(45) Date of Patent: Mar. 17, 2009

(54) MOLDED ASSEMBLY TO COMBINE A STEERING TUBE MADE OF RESIN BLENDED WITH CARBON FIBER COMPOSITES AND A CROWN MADE OF ALUMINUM FOR USE IN A TWO WHEELED VEHICLE FORK ASSEMBLY

(75) Inventor: Brady Matthew Schroeder, Simi Valley, CA (US)

(73) Assignee: Answer Products, Inc., Valencia, CA (US)

( * ) Notice: Subject to any disclaimer, the term of this patent is extended or adjusted under 35 U.S.C. 154(b) by 390 days.

(21) Appl. No.: 11/500,764

(22) Filed: Aug. 7, 2006

(51) Int. Cl.
*B62K 21/04* (2006.01)
(52) U.S. Cl. .................. 280/280; 280/279; 280/276
(58) Field of Classification Search .............. 280/280, 280/279, 276, 281.1, 288.3; 403/389, 177
See application file for complete search history.

(56) References Cited

U.S. PATENT DOCUMENTS

| | | |
|---|---|---|
| 4,838,569 A | 6/1989 | Ford |
| 4,902,458 A | 2/1990 | Trimble |
| 5,078,417 A | 1/1992 | Mouritsen |
| 5,346,237 A | 9/1994 | Wang |
| 5,762,352 A | 6/1998 | Lee |
| 6,017,048 A | 1/2000 | Fritschen |
| 6,270,104 B1 | 8/2001 | Nelson et al. |
| 6,340,509 B1 | 1/2002 | Nelson |
| 6,503,589 B1 | 1/2003 | Fritschen |
| 6,655,707 B2 | 12/2003 | Buckmiller |
| 6,848,700 B1 | 2/2005 | Fritschen |
| 6,955,372 B1 | 10/2005 | Fritschen |
| 6,994,367 B2 | 2/2006 | Mock |
| 2005/0012299 A1 | 1/2005 | Schauman |

*Primary Examiner*—Tony H. Winner
(74) *Attorney, Agent, or Firm*—Thomas I. Rozsa

(57) ABSTRACT

A molded assembly for a unique combination of a steering tube and crown for use in a two vehicle fork such as a bicycle fork, wherein the steering tube transversely connects to the crown at the crown's center position. The crown is further connected to the fork leg housings. The steering tube is comprised of a bottom neck portion and a main round body portion, wherein the bottom neck is varies in shape from a round to non-round exterior which is used to eliminate rotation when the tube is molded into the crown. The interior of the crown at the location where it is molded into the steering tube is also formed in a matching non-round shape. The steering tube is chemically made of uncured resin blended with carbon fiber composites, which can be cured under heat after the assembly is molded.

13 Claims, 5 Drawing Sheets

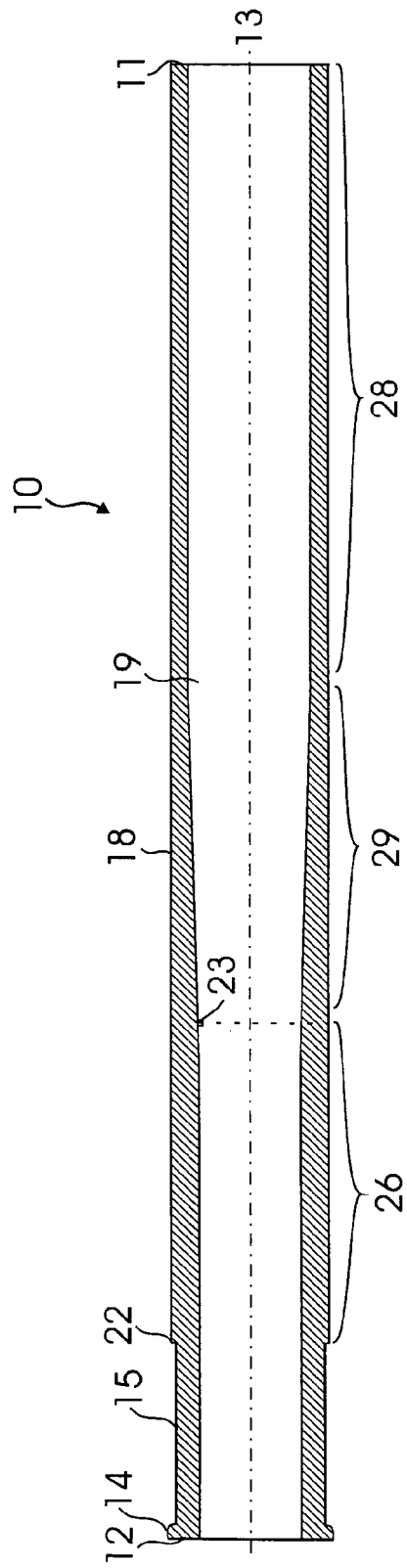
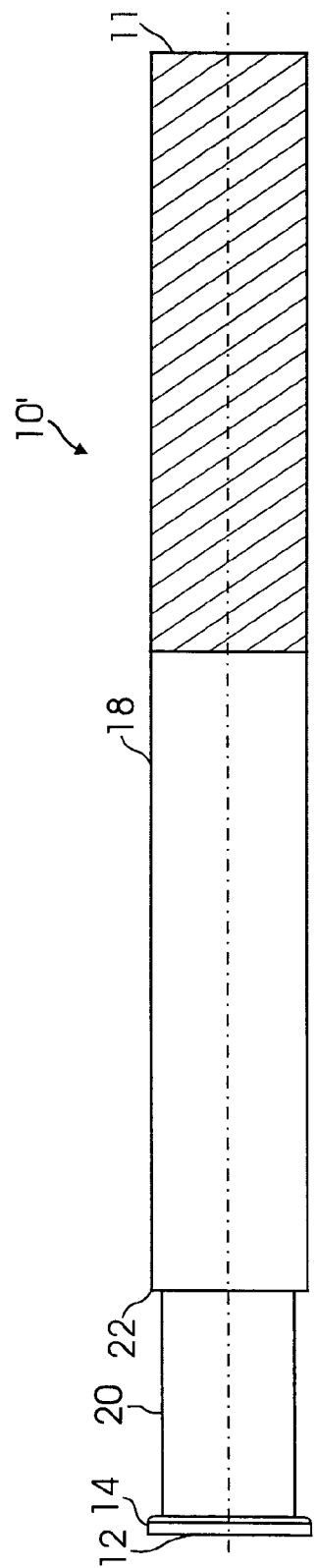
FIG. 2
FIG. 4

MOLDED ASSEMBLY TO COMBINE A STEERING TUBE MADE OF RESIN BLENDED WITH CARBON FIBER COMPOSITES AND A CROWN MADE OF ALUMINUM FOR USE IN A TWO WHEELED VEHICLE FORK ASSEMBLY

BACKGROUND OF THE INVENTION

1. Field of the Invention

The present invention is related to the field of an improved combination for a steering tube and crown which is used as part of a bicycle fork or motorcycle fork assembly.

2. Description of the Prior Art

The following 14 patents and published patent applications are the closest prior art references to the present invention.

1. U.S. Pat. No. 4,838,569 issued to Thomas R. Ford on Jun. 13, 1989 for "Bicycle" (hereafter the "Ford patent");

2. U.S. Pat. No. 4,902,458 issued to Brent J. Trimble on Feb. 20, 1990 for "Method Of Molding Composite Bicycle Frames" (hereafter the "Trimble patent");

3. U.S. Pat. No. 5,078,417 issued to John Mouritsen and assigned to Cycle Composites, Inc. on Jan. 7, 1992 for "All Terrain Cycle Fork With Fiber Reinforced Resin Blades And Crown And Method Of Making Same" (hereafter the "Mouritsen patent");

4. U.S. Pat. No. 5,346,237 issued to Tsai-Te Wang on Sep. 13, 1994 for "Bicycle Frame Consisted Of Carbon Fiber Frame Tubes And Metal Connectors" (hereafter the "Wang patent");

5. U.S. Pat. No. 5,762,352 issued to Kyu-Wang Lee on Jun. 9, 1998 for "Bicycle Fork Having A Fiber Reinforced Steerer Tube And Fiber Reinforced Crown Blades And Method Of Making Same" (hereafter the "Lee patent");

6. U.S. Pat. No. 6,017,048 issued to Thomas M. Fritschen on Jan. 25, 2000 for "Aero Bicycle Frame" (hereafter the "048 Fritschen patent");

7. U.S. Pat. No. 6,270,104 issued to Ronald H. Nelson et al. and assigned to Trek Bicycle Corporation on Aug. 7, 2001 for "Composite Bicycle Frame And Methods For Its Construction" (hereafter the "Nelson patent");

8. U.S. Pat. No. 6,340,509 issued to Ronald H. Nelson et al. and assigned to Radius Engineering, Inc. on Jan. 22, 2002 for "Composite Bicycle Frame And Method Of Construction Thereof" (hereafter the "Nelson patent");

9. U.S. Pat. No. 6,503,589 issued to Thomas M. Fritschen on Jan. 7, 2003 for "Elongated Structural Member" (hereafter the "589 Fritschen patent");

10. United States Published Patent Application No. 2005/0012299 issued to Brian E. Schuman, et al. on Jan. 20, 2005 for "Continuous Fiber Carbon Fork" (hereafter the "Schuman Published patent application");

11. U.S. Pat. No. 6,655,707 issued to Daniel K. Buckmiller et al. and assigned to Advanced Composites, Inc. on Dec. 2, 2003 for "Net Shape Filament Winding Manufacturing Process, Articles Made Therefrom And Composite Bicycle Fork And Other Components" (hereafter the "Buckmiller Patent");

12. U.S. Pat. No. 6,848,700 issued to Thomas M. Fritschen on Feb. 1, 2005 for "Bicycle With Improved Frame Design" (hereafter the "700 Fritschen Patent");

13. U.S. Pat. No. 6,955,372 issued to Thomas M. Fritschen and assigned to Thomas M. Fritschen on Oct. 18, 2005 for "Bicycle With Improved Frame Configuration" (hereafter the "372 Fritschen Patent");

14. U.S. Pat. No. 6,994,367 issued to Aaron Mock et al. and assigned to Trek Bicycle Corporation on Feb. 7, 2006 for "Metal And Reinforced Plastic Composite Bicycle Frame" (hereafter the "Mock Patent").

The Ford Patent for a bicycle discloses a one piece frame made of resilient material for the bicycle. The steering pivot or stem 26 is connected to the fork assembly 28. The patent states on Column 3 Line 57 "while a wide variety of materials could be used, I prefer to use a wound fiber and plastic composite which presents a good combination of strength and resiliency." This does not talk about the combination steering tube and crown of the present invention.

The Mouritsen Patent assigned to Cycle Composites, Inc. discloses a fork assembly which comprises a stiff steering tube made of metal and a generally hollow unitary crown and blade made of molded resin-impregnated fibrous material and a connecting assembly for interconnecting the steering tube to the unitary crown. The steering tube is molded integrally with the crown. The unitary blade and crown is made of fibrous material impregnated with synthetic resin. The steer assembly which is made of metal and is designated number 24 is molded to the crown by sections 52 which extend from the steering tube (see FIG. 6) so that it is integrally molded with the composite fork as shown in FIG. 3. In effect this is the reverse of the present invention in that it is the steering tube that is made of metal and the fork that is made of the composite material but the way the two or formed together is different than the present invention in addition to it being the reverse of the present invention.

The Wang Patent discloses a concept of having a bicycle frame where the frame tubes are comprised of carbon fiber and have metal connectors at either end of the carbon fiber tube. The connectors have respective male and female ends so that one connector can be connected to another connector while the tubes of the bicycle are made of carbon fiber.

The Lee Patent discloses the concept of having a combination steering tube and crown which are molded together wherein both the steering tube an the crown are made of fibrous resin material. The inside of the steering tube is lined with a fibrous resin which is bonded by molding to the crown to form a continuous and integral unit of fibrous resin material. Therefore, this patent discloses a concept of having both the steering tube and the crown molded together and both formed of fibrous resin material such as carbon fiber material.

The 048 Fritschen Patent is an aero bicycle frame. In this case referring to Column 14 beginning on Line 1 through Line 46 the invention discloses the concept of having the fork crown 13 which is preferably but not necessarily made of steel and is braided and/or bonded or fastened by other means to the steering tube 17 which is also made of steel. The fork is made of fiber reinforced composite laminate materials. The end of this paragraph states "it should be noted that, stated, said steering tube, said fork crown, and said bearing race support, and said front wheel receptors may be made of another suitable material, such as an injected molded plastics or fiber reinforced composites, in which case said fork blades and fiber composite fork crown may be bonded inside and outside of said steering tube or may be parts of a continuous molding of the same similar material with said steering tube said headset bearing race support and said fork crown." However, it does not talk about having the present invention of having part of the steering tube made of carbon fiber and the crown made of metal. It talks about having the entire composites made of the same material bonded to each other or having the crown and steering tube made of metal while the fork is made of resin material.

The '104 Nelson Patent discloses a concept of having a bicycle frame which is formed by joint composite tubes and lugs and is therefore an all composite bicycle frame. The lugs are used to interconnect components to the bicycle frame. Therefore, this invention discloses the concept of having numerous components of the bicycle made of preformed composite material and drawn together by composite material lugs which join to various other components such as a bicycle seat.

The Trimble Patent also discloses a method of molding composite bicycle frame. This patent discloses the concept of once again making all the components of the bicycle frame out of resin material and interconnecting them.

The '509 Nelson Patent discloses a concept of making preformed bicycle frame components made of composite materials.

The 589 Fritschen Patent is a continuation of a previous patent application which was previously discussed as the 048 Fritschen Patent. This discloses substantially the same concept as previously discussed which includes having a combination of a steering tube and crown made of metal connected to a fork made of resin material and where it states that all components can be made of resin material but does not specifically have the combination of having the steering tube made of carbon fiber and the crown made of aluminum.

The '299 Schuman Published Patent Application discloses a concept of having a comolded dropout bonded to a steering tube and continuous fibers extending up from the tip to the steering tube. The fork is completely hollow throughout its length. Referring to section 28, the patent talks about having the entire combination of both the fork and crown and steering tube made of carbon fiber material or other comparable resin material. Therefore, this patent discloses the concept of having the entire assembly made of reinforced plastic including carbon fiber material.

The Buckmiller Patent includes a method of manufacturing a composite bicycle fork and other components. Referring to Column 10 Line 24, the patent discloses the concept of having fork legs which are made of two or more sections of composite material. This includes having the fork leg 1608 having an upper fork half leg 1607 and a lower fork half leg 1611 with a tapering occurring along their length from the crown 1606 to the wheel drop out 1609.

Also, referring to FIG. 27 there is a perspective view of another bicycle fork which is basically a one piece fork assembly which has the fork leg unit 2708 being continuous from drop out to drop out and is affixed to the crown 2701 by central mounting portion 2704 by means such as bonding, the use of fasteners, and the like. The fork includes a layer of structural foam between two layers of composite material. The foam can be included to achieve desired rigidity at low weight. While once again this discloses the use of various composite material for the forks, this invention does not disclose the combination of the present invention.

The '700 Fritschen Patent is a continuation-in-part of the 589 Patent. This patent discloses the same features as previously discussed in the '589 Fritschen Patent concerning the combination of having a steering tube and crown made of metal and the fork made of composite material.

The '372 Fritschen Patent is a continuation-in-part of the '700 Fritschen Patent.

The Mock Patent discloses a metal and reinforced plastic composite bicycle frame wherein a bicycle frame 10 is formed with a metal spine 12 and an upper assembly 14 formed of carbon fiber reinforced epoxy plastic. These combine to form portions of the rear triangle 16 and main triangle 20 together forming a bicycle diamond frame.

There is a significant need to significantly improve the molded assembly which combines a steering tube and crown for use of part of the fork assembly of a two wheeled vehicle such as a bicycle fork.

SUMMARY OF THE INVENTION

The present invention relates to a molded assembly for a unique combination of a steering tube and crown for use in a two vehicle fork such as a bicycle fork, wherein the steering tube transversely connects to the crown at the crown's center position. The crown is further connected to the fork leg housings. The steering tube is comprised of a bottom neck portion and a main round body portion, wherein the bottom neck is varies in shape from a round to non-round exterior which is used to eliminate rotation when the tube is molded into the crown. The interior of the crown at the location where it is molded into the steering tube is also formed in a matching non-round shape. The steering tube is chemically made of uncured resin blended with carbon fiber composites, which can be cured under heat after the assembly is molded.

It has been discovered, according to the present invention, that if a bicycle fork assembly is comprised of a steering tube made of resin having carbon fiber composites molded into a crown made of aluminum, the bicycle fork will possesses a better durability and shock absorbing capabilities.

It has further been discovered, according to the present invention, that if the bottom of the carbon fiber steering tube is formed in a non-round shape and is molded into a crown where at the location of the intersection of the crown and steering tube, the crown is also formed in a non-round shape, then upon being molded together, then rotation of the steering tube relative to the crown is substantially reduced.

It has also been discovered, according to the present invention, that if the steering tube is chemically made of uncured resin blended with carbon fiber composites, which can be cured under heat after the assembly is molded, the molded assembly of the bicycle fork possesses better mechanical properties after the steering tube is fully cured.

It has additionally been discovered, according to the present invention, that if a flange is located at the bottom of the neck of the steering tube, the flange can eliminate the possibility that the steering tube may be pulled out of the crown during the bonding process when the steering tube is molded into the crown at the location where the crown intersects with the exterior of the bottom of the steering tube neck.

It is therefore an object of the present invention to provide a molded assembly to combine a steering tube made of resin blended with carbon fiber composites bonding to a crown made of aluminum for use as a bicycle fork so that the bicycle fork will possesses a better durability and better shock adsorption.

It is a further object of the present invention to provide a design for the combination of a steering tube and crown where the bottom of the carbon fiber steering tube is formed in a non-round shape and is molded into a crown where at the location of the intersection of the crown and steering tube, the crown is also formed in a non-round shape, so that upon being molded together, the rotation of the steering tube relative to the crown is substantially reduced.

It is also an object of the present invention to provide a steering tube which is chemically made of uncured resin blended with carbon fiber composites which can be cured under heat after the assembly is molded, so that the molded assembly of the bicycle fork will possess better mechanical properties after the steering tube is fully cured.

It is an additional object of the present invention to include a flange located at the bottom of the neck of the steering tube so that the flange can eliminate the possibility that the steering tube may be pulled out of the crown during the bonding process when the steering tube is molded into the crown at the location where the crown intersects with the exterior of the bottom of the steering tube neck.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 2 is a cross-sectional view of one preferred embodiment of a present invention steering tube made of resin blended with carbon fiber composites with a bottom neck having a round exterior surface.

FIG. 4 is a front view of another preferred embodiment of a presently invention steering tube made of resin having carbon fiber composites with a bottom neck having an elliptical exterior surface.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a molded assembly to combine a steering tube made of resin blended with carbon fiber composites with a crown made of aluminum to improve durability and shock absorption capabilities when used in a fork of a two wheeled vehicle such as a bicycle fork.

Figure 1A:
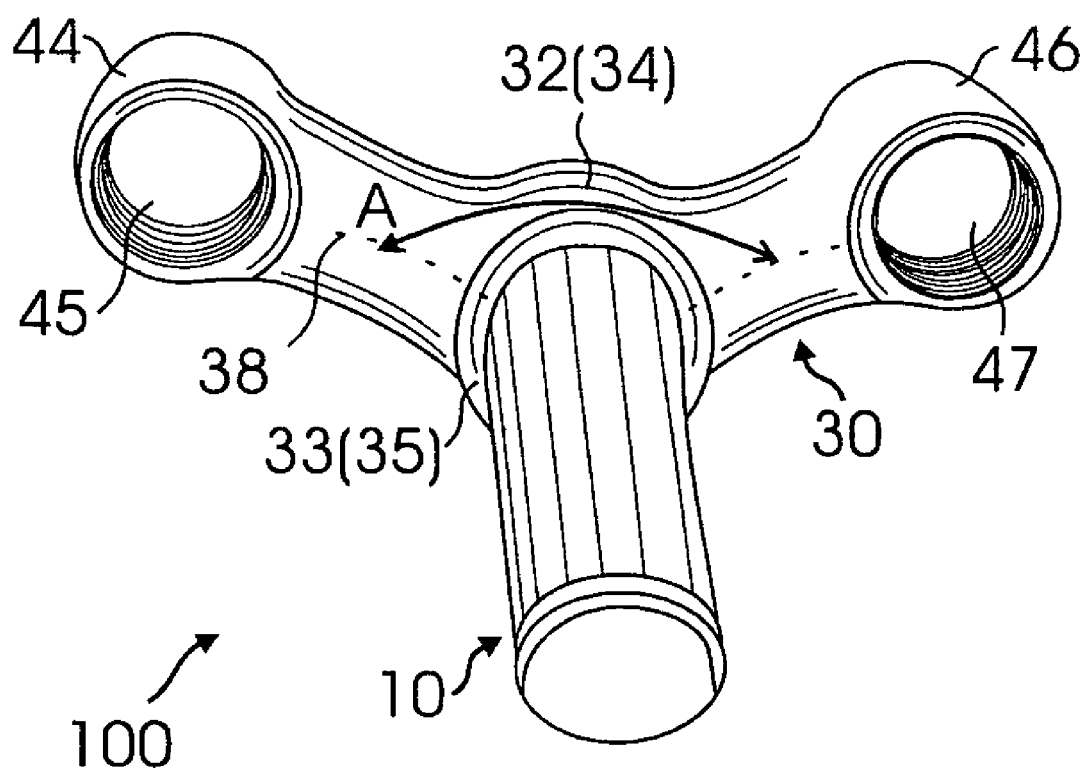
FIG. 1A is a top perspective view of the present invention of a carbon fiber steering tube molded into an aluminum crown to form part of the fork assembly of a two wheeled vehicle.
Figure 1B:
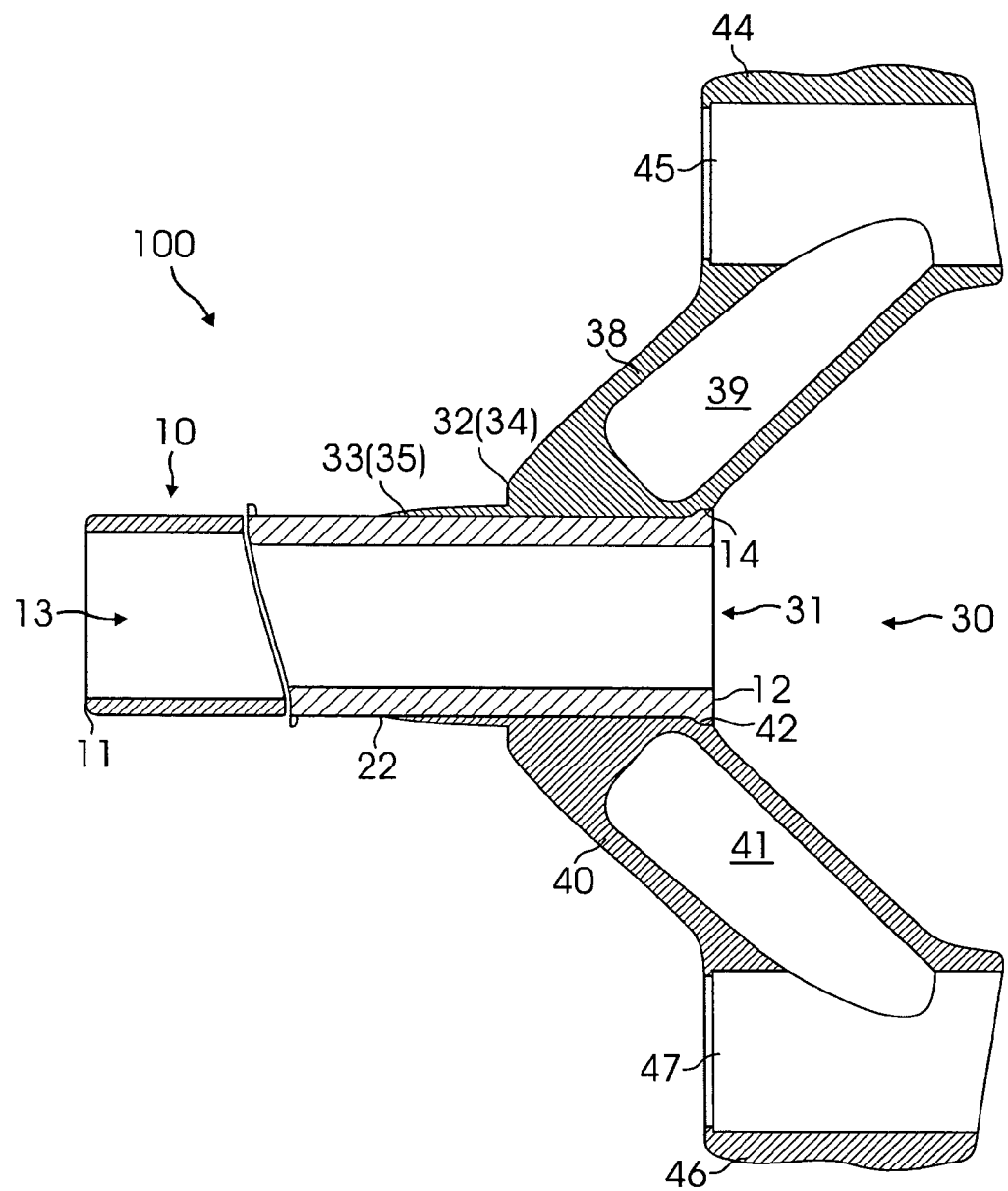
FIG. 1B is a cross-sectional view of the present invention of a steering tube made of resin blended with carbon fiber composites molded into an aluminum crown to form part of the fork assembly of a two wheeled vehicle.

Referring to FIGS. 1A, and 1B, there is illustrated present invention molded assembly 100, which is comprised of a steering tube 10 transversely connected to the center of a crown 30.

Figure 3:
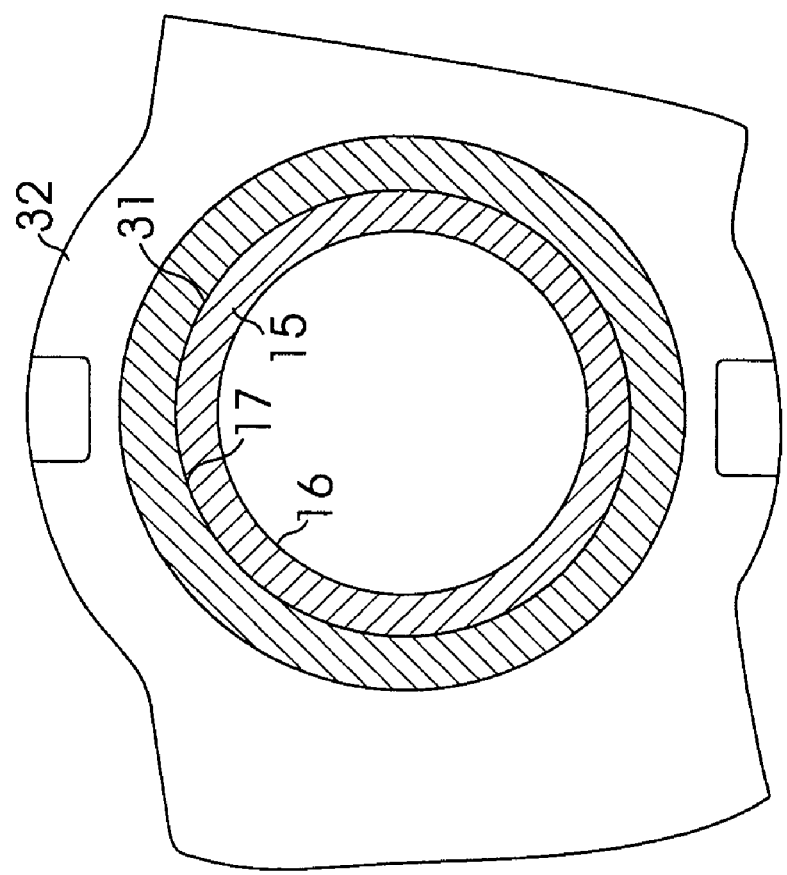
FIG. 3 is a cross section view of one preferred embodiment of the present invention, in which the steering tube made of resin blended with carbon fiber composites has a bottom neck having a round exterior surface which is molded into an aluminum crown, where the interior of the crown at the location where it intersects with exterior of the tube neck is also formed of a matching round shape.

In one preferred embodiment of the present invention illustrated from a cross section view of FIG. 2, the steering tube 10 is comprised of a first proximal end 11, a second distal end 12, and a central bore 13, wherein a flange 14 is located at the second distal end 12 of the tube. As further illustrated in FIG. 2, there is a shoulder 22 located close to the second distal end 12 of the tube, which divides the steering tube 10 into a neck 15 which composes a small portion of the tube, and a round body portion 18, which composes a major portion of the tube. As illustrated in FIG. 3, the neck 15 is comprises of a round interior surface 16 and a round exterior surface 17. Further referring to FIG. 2, the steering tube 10 has a thick tube wall section 26 starting from the second distal end 12 to a location 23 of the tube, a thin tube wall section 28 extending from the first proximal end 11 to another location 19, and a section 29 between the positions 19 and 23 where the tube wall is gradually decreased from distal to proximal location. It will be appreciated that the tube wall is designed in accordance with this configuration so that the present invention can simultaneously achieve the advantage of reduced weight and improved mechanical strength for the steering tube 10.

Figure 5:
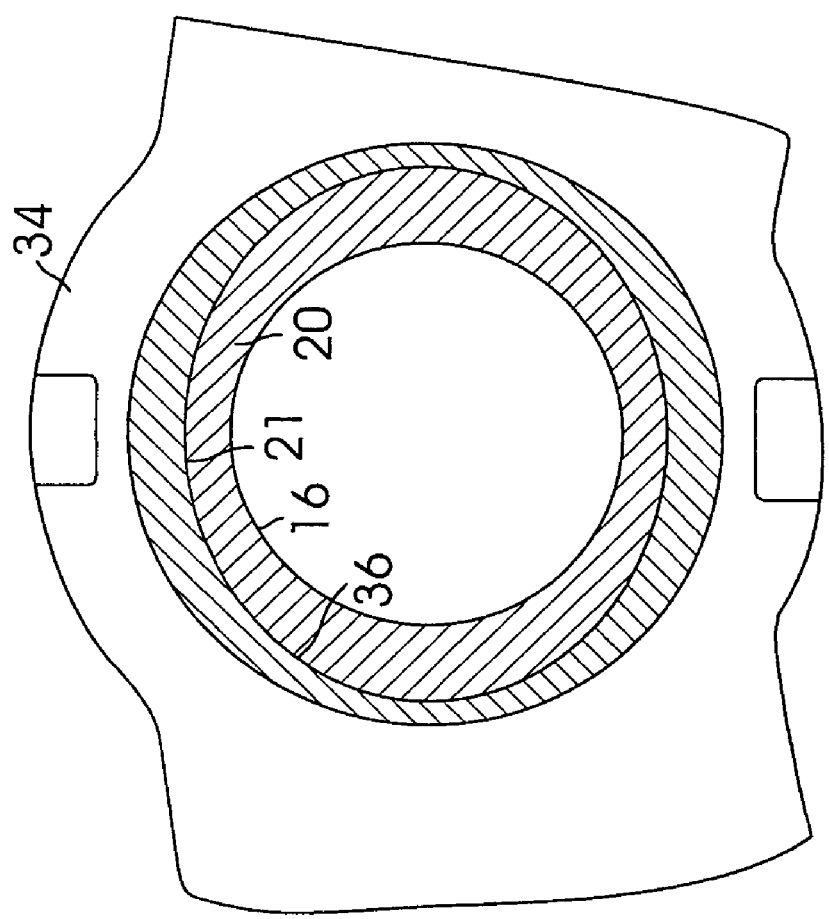
FIG. 5 is a cross-sectional view of another preferred embodiment of the present invention wherein the steering tube made of resin with carbon fiber composites is formed with a bottom neck having an elliptical exterior surface and is molded into an aluminum crown wherein the interior of the aluminum crown where it intersects with exterior of the tube neck is also formed in a matching elliptical shape.

In another preferred embodiment of the steering tube 10' as illustrated in FIGS. 4 and 5, the tube neck 20 is comprised of a round interior surface 16 and an elliptical exterior surface 21. It will be appreciated that the elliptical exterior surface 21 is designed for eliminating a potential problem of rotation of the steering tube after the tube is molded into the crown.

The crown 30 of the present invention as illustrated in FIGS. 1A, and 1B is comprised of a central portion 32 including a top hollow shoulder 33 and a bottom interior surface 42, wherein the central portion is a hallow structure having a central opening therethrough. The central portion 32 is connected to first and second side arms 38 and 40, which respectively end in a respective first and second fork leg housings 44 and 46, wherein the housings 44 and 46 are also hollow structures having respective bores 45 and 47 which respective receive a fork leg (not shown). The first and second arm 38 and 40 as illustrated from the cross-section view of FIG. 1B comprise a respective first and second void 39 and 41 inside of said side arms which provide for maintaining a strong mechanical strength while at the same time reducing the weight of the crown 30. Referring to FIG. 1A, there is illustrated that the first and second arms 38 and 40 join the central portion 32 at a preferred angle "A" of 120 degree. However, it will be appreciated that the preferred angle "A" can range from 100 to 180 degree.

Referring to FIGS. 1B, 2 and 3, there is illustrated one preferred embodiment of the present invention for joining the tube and crown, wherein the central portion 32 of the crown 30 is comprised of an interior round bore 31, which matches the round exterior surface 17 of the neck 15 of the steering tube 10. Therefore the steering tube 10 is affixed into the crown 30, wherein the neck 15 of the tube is molded into the bore 31 in accordance with a structural configuration so that the end flange 14 of the tube matches the bottom interior surface 42 of the central portion of the crown and the top of the shoulder 33 of the crown is affixed to the shoulder 22 of the tube. It will be appreciated that with the aid that the bottom flange 14 of the tube matching the interior surface 42 of the central portion of the crown, the present invention configuration will prevent the steering tube 10 from being puled out of the crown 30. It will also be also appreciated that with the aid of the top shoulder 33 of the crown 30, the present invention is able to reduce the stress of the tube, where it joins the crown.

In another preferred embodiment of the present invention as shown in FIGS. 1B, 4 and 5 for affixing the steering tube into the crown, the central portion 34 of the crown 30 is comprised of an interior elliptical bore 36, which matches the elliptical exterior surface 21 of the neck 20 of the steering tube 10. Therefore the steering tube 10 is able to be affixed into the crown 30, wherein the neck 20 of the tube is molded into the bore 36. It is appreciated that with the aid of the elliptical interior bore 36 to mate the elliptical exterior surface 21 of the tube, the present invention can eliminate the potential problem of rotation of the steering tube inside of the crown. It will be further appreciated that in addition to being elliptical, the matching exterior surface of the steering tube and the interior bore of the crown can be any matching non-round shape, including but not limited to oval, triangular, pentagonal, and hexagonal.

In general, aluminum is a preferred material for manufacturing the crown, but any appropriate metal and metal alloy are also effective for use with the present invention, including but not limited to copper, aluminum magnesium and titanium alloys. For achieving a better durability, the present invention utilizes composites of carbon fiber blended with uncured resin to manufacture the steering tubes. It will be appreciated that the resin can be fully cured after the molded assembly so that the steering tube is affixed into the crown under heat for curing, which will result in a better durability of the assembly for use as a bicycle fork.

With any of the designs as set forth above, the crown which is preferably made of aluminum and the carbon fiber steering are placed in a mold where the neck of the steering tube is placed into the central bore area of the crown. The mold is then closed and heated. The carbon fiber of the steering tube is made of uncured epoxy soaked carbon fibers and it won't fully cure until it is subjected to high heat. The resin is already built into the carbon fiber steering tube. In addition, in the preferred embodiment the steering tube and matching interior of the crown are non-round. This facilitates better bonding the provides anti-torsional means of the steering tube relative to the crown. Further, the non-round interior features prevent slip at the point intersection between the crown and the steering tube.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

Defined in detail, the present invention is an assembly for use as a component of a bicycle fork, comprising: (a) a steering tube having a first proximal end and a second distal end, a flange located at the second distal end, the tube having a shoulder which is located near the second distal end of the tube, the shoulder dividing the steering tube into a neck between the shoulder and the second distal end and a round body portion extending from the shoulder to the first proximal end, the neck having a round interior and exterior surface, the steering tube having a thick tube wall section close the second distal end of the tube, a thin tube wall section at the first proximal end, and the tube wall tapering from adjacent the shoulder to the first proximal end; (b) a crown having a central portion including a top hollow shoulder and a bottom interior surface which matches the flange at the second end of the steering tube, the central portion of the crown having a round interior bore which matches the round exterior surface of the neck of the steering tube, the central portion connected to first and second side arms which respectively are connected to receiving members which respectively receive fork legs; and (c) said steering tube made of uncured resin with epoxy soaked carbon fibers and the crown made of material selected from the group comprising of copper, aluminum, magnesium and titanium, the steering tube placed into the crown so that the neck is inserted into the matching shaped bore of the crown, the steering tube and crown placed into a mold and subjected to heat so that the carbon fiber steering tube is bonded into the crown and the epoxy soaked carbon fibers do not fully cure until subjected to heat which bonds the steering tube to the crown.

Defined more broadly, the present invention is an assembly for use as a component of a two wheeled vehicle fork, comprising: (a) a steering tube having a first proximal end and a second distal end, a flange located at the second distal end, the tube having a neck which is located proximate the second end of the tube, the neck having a round exterior surface; (b) a crown having a central portion including a bottom interior surface which matches the flange at the second end of the tube, the central portion having a round bore which matches the round exterior surface of the neck of the steering tube; and (c) said steering tube made of uncured resin with epoxy soaked carbon fibers and the crown made of material selected from the group comprising of copper, aluminum, magnesium and titanium, the steering tube placed into the crown so that the neck is inserted into the matching shaped bore of the crown, the steering tube and crown placed into a mold and subjected to heat so that the carbon fiber steering tube is bonded into the crown and the epoxy soaked carbon fibers do not fully cure until subjected to heat which bonds the steering tube to the crown.

Defined even more broadly, the present invention is an assembly for use as a component of a bicycle fork, comprises (a) a steering tube having a first proximal end and a second distal end, the tube having a neck portion located adjacent to the second distal end, the neck portion having a non-round exterior surface; (b) a crown having a central portion having an interior non-round bore which matches the non-round exterior surface of the neck of the steering tube; and (c) said steering tube made of uncured resin and the crown made of metal, the steering tube placed into the crown so that the neck is inserted into the matching shaped bore of the crown, the steering tube and crown placed into a mold and subjected to heat so that the steering tube is bonded into the crown.

Defined alternatively in detail, the present invention is an assembly for use as a component of a two-wheeled vehicle fork, comprising: (a) a steering tube having a first proximal end and a second distal end, the tube having a neck portion located adjacent to the second distal end, the neck portion having a non-round exterior surface; (b) a crown having a central portion having an interior non-round bore which matches the non-round exterior surface of the neck of the steering tube; and (c) said steering tube made of uncured resin with epoxy soaked carbon fibers and the crown made of aluminum, the steering tube placed into the crown so that the neck is inserted into the matching shaped bore of the crown, the steering tube and crown placed into a mold and subjected to heat so that the carbon fiber steering tube is bonded into the crown and the epoxy soaked carbon fibers do not fully cure until subjected to heat which bonds the steering tube to the crown.

Defined alternatively more broadly, the present invention is an assembly for use as a component of a two-wheeled vehicle fork, comprising: (a) a steering tube having a first proximal end and a second distal end, the tube having a neck portion located adjacent to the second distal end, the neck portion having a non-round exterior surface; (b) a crown having a central portion having an interior non-round bore which matches the non-round exterior surface of the neck of the steering tube; and (c) said steering tube made of uncured resin and the crown made of metal, the steering tube placed into the crown so that the neck is inserted into the matching shaped bore of the crown, the steering tube and crown placed into a mold and subjected to heat so that the steering tube is bonded into the crown.

What is claimed is:

1. An assembly for use as a component of a bicycle fork, comprising:
   a. a steering tube having a first proximal end and a second distal end, a flange located at the second distal end, the tube having a shoulder which is located near the second distal end of the tube, the shoulder dividing the steering tube into a neck between the shoulder and the second distal end and a round body portion extending from the shoulder to the first proximal end, the neck having a round interior and exterior surface, the steering tube having a thick tube wall section close the second distal end of the tube, a thin tube wall section at the first proximal end, and the tube wall tapering from adjacent the shoulder to the first proximal end;
   b. a crown having a central portion including a top hollow shoulder and a bottom interior surface which matches the flange at the second end of the steering tube, the central portion of the crown having a round interior bore which matches the round exterior surface of the neck of the steering tube, the central portion connected to first and second side arms which respectively are connected to receiving members which respectively receive fork legs; and
   c. said steering tube made of uncured resin with epoxy soaked carbon fibers and the crown made of material selected from the group comprising of copper, aluminum, magnesium and titanium, the steering tube placed into the crown so that the neck is inserted into the matching shaped bore of the crown, the steering tube and crown placed into a mold and subjected to heat so that the carbon fiber steering tube is bonded into the crown and the epoxy soaked carbon fibers do not fully cure until subjected to heat which bonds the steering tube to the crown.

2. The molded assembly in accordance with claim 1, wherein said first and second arms join the central portion of the crown at a preferred angle ranging from 100 degrees to 180 degrees.

3. An assembly for use as a component of a two wheeled vehicle fork, comprising:
   a. a steering tube having a first proximal end and a second distal end, a flange located at the second distal end, the tube having a neck which is located proximate the second end of the tube, the neck having a round exterior surface;
   b. a crown having a central portion including a bottom interior surface which matches the flange at the second end of the tube, the central portion having a round bore which matches the round exterior surface of the neck of the steering tube; and
   c. said steering tube made of uncured resin with epoxy soaked carbon fibers and the crown made of material selected from the group comprising of copper, aluminum, magnesium and titanium, the steering tube placed into the crown so that the neck is inserted into the matching shaped bore of the crown, the steering tube and crown placed into a mold and subjected to heat so that the carbon fiber steering tube is bonded into the crown and the epoxy soaked carbon fibers do not fully cure until subjected to heat which bonds the steering tube to the crown.

4. An assembly for use as a component of a bicycle fork, comprising:
   a. a steering tube having a first proximal end and a second distal end, the tube having a neck portion located adjacent to the second distal end, the neck portion having a non-round exterior surface;
   b. a crown having a central portion having an interior non-round bore which matches the non-round exterior surface of the neck of the steering tube; and
   c. said steering tube made of uncured resin and the crown made of metal, the steering tube placed into the crown so that the neck is inserted into the matching shaped bore of the crown, the steering tube and crown placed into a mold and subjected to heat so that the steering tube is bonded into the crown.

5. The assembly in accordance with claim 4 wherein the metal out of which the crown is made is selected from the group comprising copper, aluminum, magnesium and titanium.

6. The assembly in accordance with claim 4 wherein the uncured resin of the steering tube is made of composites of carbon fiber blended with uncured resin, the uncured resin is able to be fully cured only after being subjected to heat.

7. An assembly for use as a component of a two-wheeled vehicle fork, comprising:
   a. a steering tube having a first proximal end and a second distal end, the tube having a neck portion located adjacent to the second distal end, the neck portion having a non-round exterior surface;
   b. a crown having a central portion having an interior non-round bore which matches the non-round exterior surface of the neck of the steering tube; and
   c. said steering tube made of uncured resin with epoxy soaked carbon fibers and the crown made of aluminum, the steering tube placed into the crown so that the neck is inserted into the matching shaped bore of the crown, the steering tube and crown placed into a mold and subjected to heat so that the carbon fiber steering tube is bonded into the crown and the epoxy soaked carbon fibers do not fully cure until subjected to heat which bonds the steering tube to the crown.

8. The assembly in accordance with claim 7 wherein the exterior surface of the neck is elliptical and the interior bore of the crown is a matching elliptical shape.

9. An assembly for use as a component of a two-wheeled vehicle fork, comprising:
   a. a steering tube having a first proximal end and a second distal end, the tube having a neck portion located adjacent to the second distal end, the neck portion having a non-round exterior surface;
   b. a crown having a central portion having an interior non-round bore which matches the non-round exterior surface of the neck of the steering tube; and
   c. said steering tube made of uncured resin and the crown made of metal, the steering tube placed into the crown so that the neck is inserted into the matching shaped bore of the crown, the steering tube and crown placed into a mold and subjected to heat so that the steering tube is bonded into the crown.

10. The assembly in accordance with claim 9 wherein said crown is made of aluminum.

11. The assembly in accordance with claim 9 wherein the metal out of which the crown is made is selected from the group comprising copper, aluminum, and titanium.

12. The assembly in accordance with claim 9 wherein the uncured resin of the steering tube is made of composites of carbon fiber blended with uncured resin, the uncured resin is able to be fully cured only after being subjected to heat.

13. The assembly in accordance with claim 9 wherein the exterior surface of the neck is elliptical and the interior bore of the crown is a matching elliptical shape.

* * * * *